United States Patent [19]
Low et al.

[11] 3,816,094

[45] June 11, 1974

[54] METHOD FOR THE CONVERSION OF CHROMITE ORE TO SODIUM CHROMATE

[75] Inventors: William Wayne Low, Syracuse; Douglas Gene Frick, Liverpool; Alan Brian Gancy, Syracuse, all of N.Y.

[73] Assignee: Allied Chemical Corporation, New York, N.Y.

[22] Filed: Mar. 9, 1972

[21] Appl. No.: 233,128

[52] U.S. Cl............................ 75/3, 423/53, 423/61, 264/15, 252/188.3
[51] Int. Cl................................................. C22b 1/24
[58] Field of Search...... 423/61, 53; 75/.5 R, .5 AB, 75/3; 252/188.3; 264/15

[56] References Cited
UNITED STATES PATENTS

| | | | |
|---|---|---|---|
| 2,077,096 | 4/1937 | Carpenter et al.................... | 423/61 |
| 2,394,793 | 2/1946 | Maier....................................... | 75/3 |
| 2,501,952 | 3/1950 | Maier................................ | 423/62 X |
| 3,095,266 | 6/1963 | Lauder et al. ........................ | 423/61 |

Primary Examiner—Herbert T. Carter
Attorney, Agent, or Firm—Gerard P. Rooney; Jack B. Murray, Jr.

[57] ABSTRACT

A method of producing sodium chromate from chromite ore which involves mixing the ore with sodium carbonate and a refractory diluent, pelleting the mixture at a temperature of at least 36° C. using a pelleting liquid which may be water or water containing dissolved substances, drying and roasting the pellets under oxidizing conditions, then disintegrating and extracting the pellets to obtain an aqueous solution of sodium chromate.

The practice of pelleting the mix at a temperature at least above that at which sodium carbonate decahydrate normally forms, provides pellets of improved strength to withstand handling and roasting in a furnace.

13 Claims, No Drawings

METHOD FOR THE CONVERSION OF CHROMITE ORE TO SODIUM CHROMATE

CROSS-REFERENCE TO RELATED APPLICATIONS

Co-filed U.S. patent applications "Process for the Production of Sodium Chromate from Chromite Ore," and "Method for Recovering Chromium Values from Chromium Ore," Ser. No. 233,351, filed Mar. 9, 1972 and Ser. No. 233,286, filed Mar. 9, 1972, respectively.

BACKGROUND OF THE INVENTION

1. Field of the Invention

This invention relates to the manufacture of chromates, and more particularly to a method for the alkaline roasting of chromite ore.

2. Description of the Prior Art

To the best of our knowledge no one in American industry today is manufacturing chrome chemicals using a pelleted chrome ore mix. Nonetheless, the virtue of pelleting mix components prior to oxidative roasting has been recognized for some time (U.S. Pat. Nos. 2,394,793; 2,501,952; 3,095,266).

All prior art teaches that lime or some other alkaline earth compound is required in the mix to yield a dried pellet which is strong enough to be handled, and which will survive the roasting process. However, it has been recognized that the use of lime is undesirable because it leads to slime formation in subsequent leaching operations. This in turn results in sluggish leaching and yield losses. The use of lime also complicates the chemistry of leaching, which results in pollution problems arising from leached residue which must be discarded. Lime also insolubilizes aluminum values present in chromite ore, thereby tying up a potentially valuable co-product.

Co-filed patent application, Ser. No. 233,351, discloses preparation of strong, dried chrome ore pellets without the use of lime or alkaline earth compounds by incorporation of certain electrolytes.

SUMMARY OF THE INVENTION

The present invention is particularly directed to the production of pellets of improved dry strength by pelleting at an elevated temperature above about 36° C. using water as the pelleting liquid. The surprising results we have obtained suggest the following theory, which we offer in explanation, but which is not to be considered binding:

When hydrated sodium carbonate, and particularly the decahydrate, $Na_2CO_3 \cdot 10H_2O$, is permitted to form in the green pellet, a strong wet pellet is generally obtained, but the latter gives way to a weak, porous $Na_2CO_3$ structure upon drying.

The formation of the decahydrate can be obviated in the green pellet, by pelleting the mix at a temperature above that at which the decahydrate is normally formed, namely above the range of 32° to 35.4° C. Thus by pelleting a mix comprising chromite ore and sodium carbonate with or without a refractory diluent, at a temperature of at least 36° C., a pellet is obtained which on drying has sufficient strength to withstand the necessary handling operations.

The water used may be substantially pure or it may contain dissolved substances such as sodium carbonate, sodium hydroxide or other salts and alkalies. The use of water alone represents a most economical procedure. In applying the method of the present invention for pellets to be roasted in a rotary kiln, it is preferable to use a refractory diluent to control the amount of melt in the hot pellet so it will withstand the compressive forces inherent in rotary kiln operations. In the absence of a refractory diluent, additional properties may be imparted to the pellet by oxidation of the iron in the ore as disclosed in co-filed application, Ser. No. 233,286, making it suitable for roasting in a static bed furnace.

DESCRIPTION OF THE PREFERRED EMBODIMENT

The process of the present invention is directed to a method of obtaining solutions of sodium chromate from chromite ore. More particularly the process is directed to a method of producing pellets of a mixture of chromite ore, soda ash and preferably an inert diluent, using standard pelleting equipment, but operating at temperatures above about 36° C. Water or alternately a dilute aqueous solution of an electrolyte such as sodium carbonate is employed as the pelleting liquid. Preferably, the green pellets are maintained at a temperature above 36° C. until the water is driven out by drying, but this is not essential, as strong pellets can also be obtained when, for a period following their initial preparation, they fall below the 32° to 34.5° C. transition temperature for sodium carbonate decahydrate.

Sodium carbonate as soda ash is mixed with pulverized chromite ore, the quantity of carbonate being about 80 to 200%, preferably 100 to 150% of the stoichiometric amount required to convert the chrome values in the ore to soluble sodium chromate. This we refer to as the two component system whether or not electrolyte is dissolved in the pelleting water. The dry pelleting mix is fed to a pelletizer maintained at a temperature of at least about 36° C., preferably at a temperature between 40° and 100° C., and the mix is pelleted while adding the pre-heated water, or an aqueous electrolyte such as sodium carbonate solution, at a temperature of at least 36° C., desirably in excess of 40° C. and preferably as a spray. The pellets produced by this procedure, when dried, are suitable after preoxidation for roasting in the static bed of a straight grate, circular grate or hearth furnace, where there are no compressive forces due to rolling.

When an amount of inert refractory diluent is added, equal to from 0 to 200% or preferably from 30 to 150% of the weight of the chromite ore, which we term a "three component system," the resulting pellets give a high yield conversion even in a rotary kiln where the motion and the compressive forces are more rigorous.

The technique of pelleting at elevated temperatures has the effect of obviating the formation of sodium carbonate decahydrate, and results in dried pellets which have adequate strength for processing to sodium chromate. According to our theory as previously stated, it is the presence of hydrates of sodium carbonate and in particular the decahydrate, in the wet green pellet, which contributes to the low strength of dried pellets obtained when pelleting is carried out at temperatures below about 34° C. Further confirmation is indicated by the fact that pelleting at temperatures above 95° C. using at least 20% sodium hydroxide solution obviates all sodium carbonate hydrate formation (monohydrate as well as decahydrate), and results in the formation of pellets having still greater dry strength.

The type of pelleting equipment may be a heated rotary "balling pan," or any other equipment wherein the pelleting operation can be carried out at an evelated temperature using a heated pelleting liquid. The type of equipment is otherwise not critical to the process of the present disclosure.

Following the pelleting step, the green pellets are dried at a temperature up to about 500° C., preferably between 36° and 500° C.

If these pellets have been prepared from a mix containing a quantity of refractory diluent (30 to 200% of the weight of the chromite ore), they are now roasted in a rotary kiln under oxidizing conditions at a temperature within the range of 900° to 1,350° C., or preferably between 925° and 1,260° C. If on the other hand the pellets have been prepared without incorporating a diluent, it is preferable that the chromite ore be preoxidized or oxidized in situ prior to roasting in a static bed furnace such as a straight grate, a rotary grate, or a hearth furnace. The oxidizing conditions and temperature ranges remain substantially the same. Finally, the roasted pellets are cooled, crushed, and extracted with water to obtain an aqueous solution of sodium chromate, known to those skilled in the art as "yellow liquor." The extracted residue is washed with water, which wash can be combined with the sodium chromate solution, and the residue either discarded or dried and crushed for recycle as the refractory diluent.

The "refractory diluent" previously indicated as a possible component of the mix to be pelleted, may be selected from any one of a large number of refractory materials. A partial list of such materials known in the art includes pyrites cinder, iron oxide, and recycled extracted chromite ore residues from the present process, sometimes termed "refuse." These and many other refractory materials have been found to serve as satisfactory diluents.

Generally speaking, when the extracted ore residue is recycled, only a portion is so used, the balance being held as by-product, or discarded. Because of the structure of the pellets, the ease with which they are disintegrated after the roasting step, and the fact that there is no lime present to produce slimes, the sodium chromate can be extracted rapidly, economically, and in exceptionally good yield. It is entirely possible to recover considerably better than 90% of the available chromium by the method of this process.

No lime is necessary in the pelleting mix of the present invention, although the process of the invention will operate with lime addition. Lime is normally an undesirable ingredient as mentioned earlier, and it is an important feature of our process that it can be operated to produce a strong dry pellet without the use of this commonly used and undesirable additive.

A dry pellet is considered to lack sufficient strength for handling and roasting if it has a compressive strength of less than about 10 lbs.

Although the disclosed method operates satisfactorily and most economically using water as a pelleting agent, the method can operate as well, if the pelleting agent is a dilute solution of sodium carbonate, sodium hydroxide, potassium hydroxide, sodium chromate, sodium aluminate, sodium silicate or of several other salts, alkalies, or mixtures thereof.

In co-filed U.S. patent application, Ser. No. 233,351, a method is given for using relatively high concentrations of several of these materials to produce strong pellets. When such high concentrations are used, a strong dry pellet may be obtained without the necessity of pelleting at elevated temperatures.

In carrying out the method of the present invention, the pelleting temperature is preferably greater than about 36° C. and can include temperatures up to the normal boiling point of the $Na_2CO_3$ solution contained within the pellet. There is no particular advantage in operating at such higher temperatures, however, and such operation merely represents a waste of heat. In practice, conventional balling apparatus such as a rotary balling pan is used. Heat is applied to the balling pan until the desired temperature is reached, and the hot water or electrolyte solution is sprayed into the balling pan to effect good pelleting. Whenever the concentrations of electrolytes are high enough to obviate $Na_2CO_3 \cdot 10H_2O$ formation within the wet pellet at room temperature, increasing the temperature does not in general produce any stronger dried pellets. Not until the unique situation is encountered where $Na_2CO_3 \cdot H_2O$ can be essentially eliminated, as for example at high temperatures, will the dried pellet strength increase substantially. This can be accomplished using a combination of high electrolyte concentration, and high temperature. The use of such extreme conditions is not necessary, however, when the milder conditions of the present invention produce adequate strength in dried pellets.

The sodium carbonate used in the pelleting mix may be soda ash, a mixture of soda ash and sodium carbonate monohydrate, or calcined nahcolite or calcined trona.

When the green pellets are air dried, temperatures may range from 36° to 500° C., and should be kept as low as possible consistent with good drying kinetics so as to conserve heat, unless waste heat is already available. The rate of drying should be maintained below a point where "popcorning" or pellet disintegration occurs. Conventional drying techniques are suitable for the green pellets produced according to the process of the present invention, and introduce no element of criticality.

The water content of wet pellets is more a variable dependent upon the mode of operation inherent in the invention than an independent, controllable variable. In general, there will be significantly less water in the wet pellets of the present invention than in those made at room temperature (using water). There are thus two advantages to the above 36° C. concept: (a) ultimate pellet strength is increased to an acceptable range, and (b) much less water has to be removed from the pellets by drying, thus a saving in heat is achieved.

The reason for the lower water content in the pellets of the invention is directly linked to $Na_2CO_3 \cdot 10H_2O$. At room temperature enough water must be sprayed into the balling pan to satisfy $Na_2CO_3 \cdot 10H_2O$ as well as $Na_2CO_3 \cdot H_2O$ formation from some of the $Na_2CO_3$, and to plasticize the mix. Above 40° C. only enough water need be used to satisfy $Na_2CO_3 \cdot H_2O$ formation from some of the $Na_2CO_3$, and to plasticize the mix.

The above generalization holds true for dilute aqueous solutions as well as for water.

In the examples that follow, and throughout this specification, all parts and percentages are on a weight basis.

EXAMPLE 1

Effect of Pelleting Temperature Upon the Strength of Dried Chrome Ore Pellets, Using Water as the Pelleting Liquid A dry mix comprised of 57 parts by weight of finely divided chromite ore (~−200 mesh) and 43 parts of light soda ash (~−150 mesh) is pelleted with a water spray on an 11-inch balling pan at 27° C.

X-ray analysis of the "wet" pellets produced in this operation shows $Na_2CO_3 \cdot 10H_2O$ to be present.

The wet pellets are dried at 27° C. in an air stream for 2 hours, further dried at 100° C. for 3 hours, then dried at 200° C. for 2 hours. The weight loss is 31.2%, and represents the amount of water present in the wet pellet. The average compression strength of the pellets is 0.9 lb./pellet for pellets ranging from 3/8 inch to 7/16 inch in diameter.

In a companion experiment, all pelleting conditions are the same as above except that the average temperature of the pelleting bed is 67° C. Heat is applied to the balling pan by means of a bunsen flame, a heat gun, and an infrared lamp. The water used for spraying is maintained at 80° C. in contrast to the above run at room temperature. The hot, wet pellets are immediately placed in an oven and dried at 100° C. overnight. The weight loss is 16.8%, representing the amount of water in the original wet pellets.

Dried pellets ranging from 3/8 inch to 7/16 inch in diameter have an average compression strength of 12.8 lb./pellet. In each instance about 20 pellets are tested in order to obtain an average figure.

EXAMPLE 2

Effect of Pelleting Temperature Upon Strength of Dried Chrome Ore Pellets, Using Sodium Carbonate Solution as the Pelleting Liquid A mix comprising 57 parts chromite ore and 43 parts light soda ash is pelleted using a 15 wt.% sodium carbonate solution spray on an 11-inch balling pan at 25° C. The resulting wet pellets are dried in an air stream at 25° C. for 2 hours, followed by a 100° C. oven drying for 16 hours. The weight loss is 23.4% and represents the amount of water originally present in the wet pellets. The pellets have an average compression strength of 1.8 lb./pellet.

In a companion experiment all pelleting conditions are as above except the temperature which is 67° C. The wet pellets are dried in a 100° C. oven for 20 hours, with a resultant 18.6% weight loss. Pellets ranging between 3/8 inch to 7/16 inch in diameter show an average compression strength of 10.5 lbs./pellet.

EXAMPLE 3

Effect of Pelleting Temperature on Strength of Dried Chrome Ore Pellets, starting with a Three-Component Mix A mix comprised of 40.3 parts of chromite ore, 30.5 parts of light soda ash, and 29.2 parts inerts is pelleted at 25° C. on an 11-inch balling pan using a water spray. The inert material is the dried solid residue remaining after water-leaching the previously roasted pellets. It is completely water insoluble. The pellets are statically air dried at 25° C. for ½ hour, dried at 100° C. for 3 hours, and finally, at 200° C. for 2 more hours. The 25.4% weight loss reflects the initial water content. The average compression strength of all pellets is found to be less than 1 lb./pellet.

In a companion experiment the ore, soda ash, residue ratio is the same as above. The pelleting temperature is 67° C. and the pelleting liquid, a 15% $Na_2CO_3$ solution. The wet pellets are dried in a 100° C. oven for 22 hours, and lose 17.4% by weight. The average compression strength of the pellets so produced is 11.6 lbs./pellet.

Water is, of course, more economical to use than solutions of chemical compounds. It is true that the salts mentioned earlier for pelleting solutions do provide partial substitutes for the alkali metal value of the $Na_2CO_3$ normally present in the mixes. However, compounds such as potassium hydroxide or sodium silicate could be troublesome in subsequent roasting and leaching operations.

Cost is an important factor. Partial replacement of $Na_2CO_3$ by NaOH via the pelleting liquid will affect the overall cost of soda value in the roasting operation. Raw material costs alone, however, may not be the only important factor. Availability is important as well. For example, a chrome plant may be purposely located near a $Na_2CO_3$ supply, which location may not necessarily be close to a NaOH supply. Freight costs then become a consideration. Still another cost reduction introduced by the hot pelleting procedure of the present invention, stems from the fact that less heat is required to dry the green pellets. It was seen earlier that pellets produced at temperatures above the transition point for $Na_2CO_3 \cdot 10H_2O$, using water or dilute electrolyte solution, inherently contain substantially less water than those produced below this temperature. Reduced drying requirements therefore result which tend to offset the cost of maintaining a hot pelleting operation.

One of the major benefits of the present invention lies in the fact that pellets strong enough for processing to sodium chromate are obtained easily and economically without the use of lime and all the difficulties which the presence of that undesirable additive entails.

Since certain changes may be made in carrying out the above process without departing from the scope of the invention, it is intended that all matter contained in the above description shall be interpreted as illustrative and not in a limiting sense.

We claim:

1. A method of producing a green pellet which comprises forming pellets from a composition including chromite ore, sodium carbonate and water as the pelleting liquid at a temperature of at least 36° C to prevent the formation of sodium carbonate decahydrate during formation of said pellets.

2. The method of claim 1 wherein the pelleting liquid is water containing dissolved solids.

3. The method of claim 1 wherein the pelleting liquid is water containing sodium carbonate in solution.

4. The method of claim 1 wherein the green pellets are thereafter dried at a temperature up to 500° C.

5. The method of claim 1 wherein soda ash is present in the amount of between 80 and 200% of the stoichiometric amount required to convert the chromium values present in the ore to sodium chromate.

6. The method of claim 1 wherein the pelleting composition contains a refractory diluent in an amount up to 200% of the weight of the chromite ore.

7. The method of claim 6 wherein the refractory diluent is recycled extracted chromite ore residue.

8. The method of claim 6 wherein the refractory diluent is pyrites cinder.

9. The process of claim 1 wherein about 30 – 150% by weight of refractory diluent is mixed with the chromite ore mixture.

10. A green pellet produced by forming pellets from a composition including chromite ore, sodium carbonate and substantially pure water as the pelleting liquid at temperature of at least 36° C to prevent the formation of sodium carbonate decahydrate during formation of said pellets.

11. A green pellet of claim 10 containing a refractory diluent in an amount up to 200% of the weight of the chromite ore.

12. A dried green pellet having a compressive strength of at least 10 pounds comprising the pellet of claim 10, dried at a temperature up to 500° C.

13. A dried green pellet having a compressive strength of at least 10 pounds comprising the pellet of claim 11, dried at a temperature up to 500° C.

* * * * *